July 19, 1938.   J. B. RAGSDALE ET AL   2,124,236
METHOD USEFUL IN THE MANUFACTURE OF TOOLS AND THE LIKE
Filed April 27, 1935
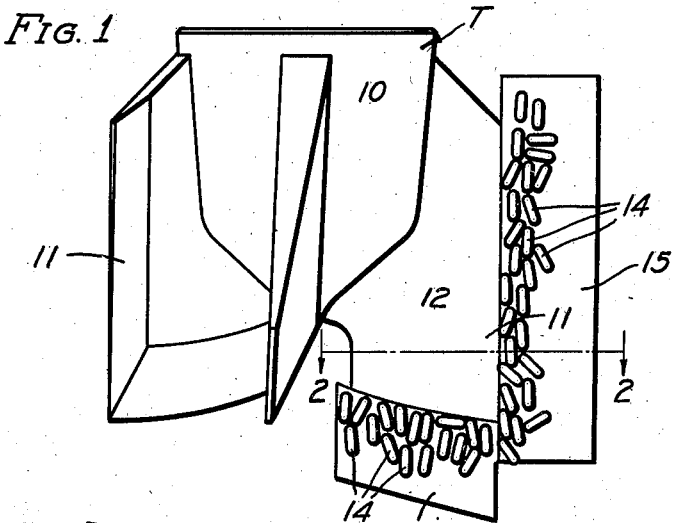
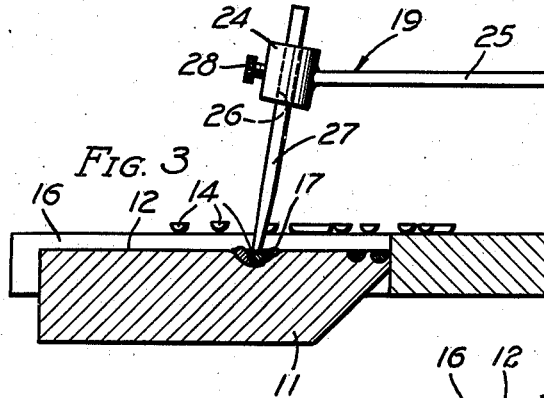
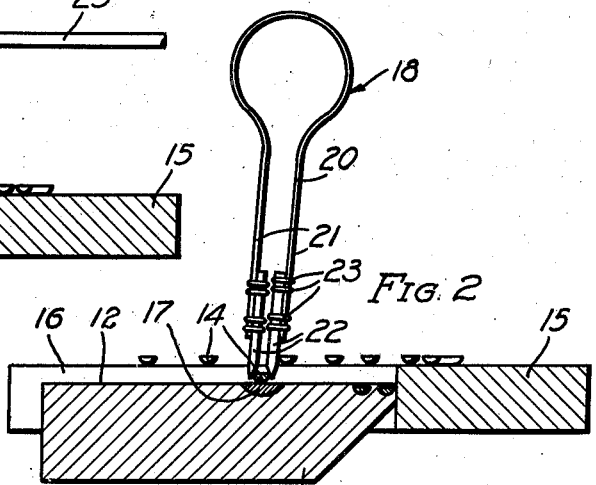
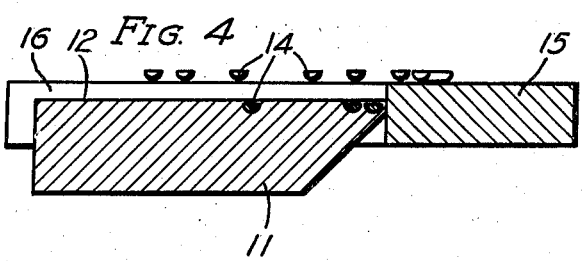
John B. Ragsdale
Robert B. Goodwin
Inventors
Attorney Patented July 19, 1938

2,124,236

UNITED STATES PATENT OFFICE 2,124,236

METHOD USEFUL IN THE MANUFACTURE OF TOOLS AND THE LIKE

John B. Ragsdale, Whittier, and Robert G. Goodwin, Fullerton, Calif., assignors to Globe Oil Tools Company, Los Nietos, Calif., a corporation of California Application April 27, 1935, Serial No. 18,542

3 Claims. (Cl. 76—108)

This invention relates to a method useful in the manufacture of tools and relates more particularly to a method for setting diamond substitutes, abrasive particles, or resistant elements in a tool such as a well drilling tool. A general object of this invention is to provide a simple, rapid and commercially practical method for setting particles or small bodies of hard cutting material or wear resistant material in a tool.

Well tools and other tools and devices have been provided with inserts of hard cutting material and wear taking elements such as tungsten carbide to make them efficient and long wearing. One of the most common and universal methods of providing tools with the diamond substitutes or hard inserts is to weld a steel rod to each individual insert, pick up the insert by means of the rod and place it on the face of the tool and then build up the tool about the insert with welded-on material, which last step melts the mild steel rod from the insert. The diamond substitute or insert is suddenly subjected to high temperatures when the rod is welded to it, which high temperatures are maintained for a substantial period during the process of welding the insert to the tool. The sudden subjection of the hard cutting insert or wear resistant insert to the high welding temperatures and the maintenance of the high temperatures during the welding operation have very deleterious effects upon the insert and a more or less imperfect bond results between the insert and the welded-on metal on the face of the tool.

Another object of this invention is to provide a method for setting diamond substitutes or bodies of hard wear resisting material in a tool in which the inserts are directly set or embedded in the original substance or original metal of the tool.

Another object of the invention is to provide a method for setting diamond substitutes or wear resistant inserts in a tool in which the inserts are not subjected to prolonged excessively high temperatures and, therefore, are not cracked, weakened or excessively oxidized.

Another object of the invention is to provide a method for setting diamond substitutes or bodies of cutting and wear resistant material in a tool in which the said bodies are handled at a relatively high temperature and while at such a temperature are partially or entirely immersed in puddled or molten portions of the tool whereby an effective secure bond is obtained between the original metal of the tool and the said bodies.

Another object of this invention is to provide a method of the character mentioned in which the diamond substitutes or bodies of hard cutting material may be accurately set or positioned in the tool.

Another object of the invention is to provide a means useful in carrying out the above-mentioned method that slowly raises the diamond substitutes or bodies of hard cutting material to a relatively high temperature when in a position where they are conveniently accessible for setting in the tool.

The various objects and features of the invention will become apparent from the following detailed description of a typical preferred manner of carrying out the method of the invention, in which:

Fig. 1 is a view of a typical well drilling tool arranged in a horizontal position illustrating a plurality of diamond substitutes or bodies of hard cutting material arranged in position on plates adjacent a blade of the tool. Fig. 2 is an enlarged vertical detailed sectional view taken substantially as indicated by line 2—2 on Fig. 1 illustrating the step of placing one of the inserts or bodies in a puddled portion of the tool. Fig. 3 is a view similar to Fig. 2 illustrating the manner of pushing or forcing the body into the puddle, and Fig. 4 is a view similar to Fig. 2 showing the body set in the tool after the molten portion or puddle has cooled and solidified.

The method of the present invention is adapted for use in the manufacture of devices and tools of various characters. Throughout the following detailed disclosure we will describe a typical manner of carrying out the method in setting diamond substitutes in a more or less typical well drilling bit, it being understood that the invention is not to be construed as limited or restricted to the specific application of the invention about to be described, but that it is to be taken as including any features or modifications that may fall within the scope of the claims.

The particular well tool T illustrated in the drawing is in the nature of a well drilling bit comprising a shoe or body 10 and spaced projecting blades 11. The blades 11 have relatively flat forward faces or active faces 12. In the following description it will be assumed that the tool T is a unit or single integral part, it being obvious that the blades 11 may be separable and that the method of the invention may be employed in providing the separate and individual blades 11 with diamond substitutes, in which case each blade 11 may be considered a tool or cutting part.

The method provided by the present invention includes, generally, the heating of the diamond substitutes or the bodies 14 of hard cutting material, or the slow raising of the bodies 14 to a suitable relatively high temperature, the puddling or melting of a portion of the face of the tool T and the immersing or setting of a hot body 14 in the molten portion of the tool.

The inserts or bodies 14 may be natural products or may be manufactured products such as pieces of tungsten carbide or the like. In the particular case illustrated in the drawing the bodies 14 have substantially flat upper surfaces and cylindrically curved lower surfaces. It is to be understood that the bodies 14 may be of any configuration. While the step of heating the wear resisting hard cutting bodies 14 and the step of maintaining the bodies 14 at a suitable relatively high temperature may be accomplished in various manners the invention provides a practical and convenient means for slowly raising the temperature of the bodies 14 to the desired temperature during the setting operation. The invention provides plates 15 and 16 for carrying or supporting the bodies 14 in positions adjacent the cutting part or tool. Where the inserts or bodies 14 are to be set in a blade 14 of the tool T the plate 15 is arranged to extend along a longitudinal edge of the blade 11 and the plate 16 is set or arranged to extend along the outer or lower end of the blade. The plates 15 and 16 constitute shelves or supports and may be arranged immediately adjacent or in engagement with the edges of the blade 11 so that their upper surfaces are in the same plane as the face 12 of the blade or are slightly above the face of the blade as illustrated in the drawing.

In the preferred manner of carrying out the method of the invention the tool T or the blade 11 is heated immediately prior to the setting of the bodies 14 of hard cutting material and the heat from the blade 11 and the heat resulting from the puddling operations is transferred to the bodies 14 on the plates 15 and 16 to slowly bring the bodies 14 to a suitable relatively high temperature. It is to be understood that the bodies 14 carried on the plates 15 and 16 may be heated in other manners if desired. The diamond substitutes or bodies 14 are arranged on the upper surfaces of the plates 15 and 16 adjacent the edges of the blade 11 to be heated as just described and to be conveniently accessible for setting in the face 12 of the blade.

When the inserts or bodies 14 have been arranged in convenient positions on the plates 15 and 16 a portion of the face of the blade 11 is puddled or made molten to receive a body 14 of hard cutting material. This step of the method may be carried out in any well known manner, for example, a molten puddle such as the puddle 17 in Figs. 2 and 3 of the drawing, may be formed in the face 12 of the blade 11 by directing the flame of an acetylene torch against that portion of the tool. While the bodies 14 on the plates 15 and 16 may be warmed or heated by the flame or torch forming the puddle 17, they are not subjected to the intense direct heat of the flame and are not injured. Immediately following the formation of the molten portion or puddle 17 a body 14 is moved or carried from the plate 15 or the plate 16 and is placed in the puddle 17 and is forced downwardly therein until it is flush with or below the face 12 of the blade. The pushing or forcing of the hard body 14 into the puddle 17 assures an effective bond between the metal forming the puddle 17 and the body 14. When the insert or hard body 14 is pushed or forced below the surface 12 of the blade 11 the molten metal of the puddle 17 may flow over the upper surface of the body 14 so that the body is completely immersed in the molten metal.

Two simple effective tools may be used for handling the hot diamond substitutes or bodies 14 of hard cutting material and for positioning them in the puddles in the face of the tool or blade. One of these tools is in the form of tongs 18 while the other is a pointed instrument or finger tool 19. The tongs 18 include a body 20 of wire or other flexible material having two normally spaced arms 21. Members 22 of a material that does not tend to stick to molten metal are attached to the arms 21. In practice the members 22 may be sticks of carbon. The members 22 may be attached to the arms by U-bolts or by wrapped wire as illustrated at 23. The outer ends of the members 22 are preferably bevelled or pointed as shown to more readily engage the inserts or bodies 14. It will be apparent how the tongs 18 may be employed to pick up a particle or body 144 and place it in the puddle 17 and how the tongs may be used, if desired, to push the body 14 downwardly in the puddle.

The finger tool 19 comprises a holder having a head 24 and a handle 25 projecting laterally from the head. The head 24 is tubular having an opening 26. A member 27 of a material such as carbon is arranged through the opening 26 of the head 24 and is removably held therein by a set screw 28. A body 14 may be readily manipulated or shifted from a plate 15 or 16 to the surface 12 of the blade 11 by the member 27 of the finger tool 19 and the tool 19 may be utilized to move the hard body into the puddle 17. The end of the member 27 of the tool 19 may be engaged against the body 14 in the puddle and forced against the body to push it into the puddle 17 as shown in Fig. 3 of the drawing. The tools 18 and 19 are sometimes used together or in conjunction, or they may be used separately, when setting a body 14 in the face of the blade 11. The tongs 18 may be employed to pick up and convey the body 14 to the puddle 17 and the finger tool 19 may be used to depress or force the body 14 into the puddle 17. When the finger tool 19 is used alone it is employed to push the body 14 to the puddle 17 and to depress the body in the puddle.

Prior to the depressing or forcing of the insert or body 14 into the puddle 17 the body may be manipulated or shifted by the tools described above to assume the desired position in the finished tool. The immersing or forcing of the particle or hard body 14 into the puddle 17 of molten metal assures a very perfect bond between the original metal of the tool and the diamond substitute or body 14. Following the setting or immersion of the body 14 the molten or puddled portion of the face of the blade 11 is allowed to cool and solidify. When the molten portion of the blade 11 cools and solidifies the insert or body 14 is completely encased in and effectively bonded with the surrounding original substance or metal of the blade 11. Fig. 4 of the drawing illustrates a body 14 embedded or set in the original metal of the blade 11 that had been melted to form the puddle 17. It is to be noted that the insert or body 14 is embedded and encased in the original metal of the blade 11 and that the face or surface 12 of the blade is substantially smooth or of the original configuration. Numerous diamond inserts or bodies 14 of cutting and wear resistant material may be set or embedded in the blade 11 in the manner described above.

The method provided by the present invention may be employed to easily and quickly set diamond substitutes in the active parts or cutting parts of a tool or the like. The wear resisting particles or bodies of hard cutting material set by the method are not subjected to the direct intense heat of a welding flame. The pressing or forcing of the inserts or bodies 14 into the molten puddles of the original metal of the tool provides and insures a more effective bond between the metal and the hard bodies than is obtained by the welding of the hard bodies to the tool. The diamond substitutes or hard cutting bodies set in a tool by the method of this invention are not carried by or encased in built-up or welded-on extra metal as are the diamond substitutes set by the conventional methods, and, therefore, are more securely and dependably retained on the tool to increase its efficiency. The method does not materially alter the size or shape of the tool and provides for the setting of the wear resistant particles or bodies of hard cutting material in the desired or preferred positions in the active parts of the tool.

Having described only a typical preferred application and manner of carrying out the method of the invention we do not wish to be limited or restricted to the specific details set forth but wish to reserve to ourselves any changes or variations that may appear to those skilled in the art or fall within the scope of the following claims.

Having described our invention, we claim:

1. The method of setting bodies of hard cutting material in a cutting part comprising heating the cutting part, heating a body of hard cutting material by heat given off by the cutting part, making a puddle of a portion of the cutting part by subjecting it to a melting temperature, and then placing the heated body in the puddle.

2. The method of setting bodies of hard cutting material in a cutting part comprising heating the cutting part, positioning a body of hard cutting material so as to be heated by heat given off by the cutting part, making a portion of the original metal of the cutting part molten by the application of heat, immersing the heated body in the molten metal to bond therewith, and then allowing the molten metal to solidify.

3. The method of manufacturing a tool comprising heating the tool, heating a cutting part by heat given off by the tool, forming a molten puddle in a face portion of the tool by subjecting it to melting heat, placing the heated cutting part in the puddle, manipulating the part to the cutting position, and then allowing the molten metal of the puddle to solidify.

JOHN B. RAGSDALE.
ROBERT G. GOODWIN.